UNITED STATES PATENT OFFICE.

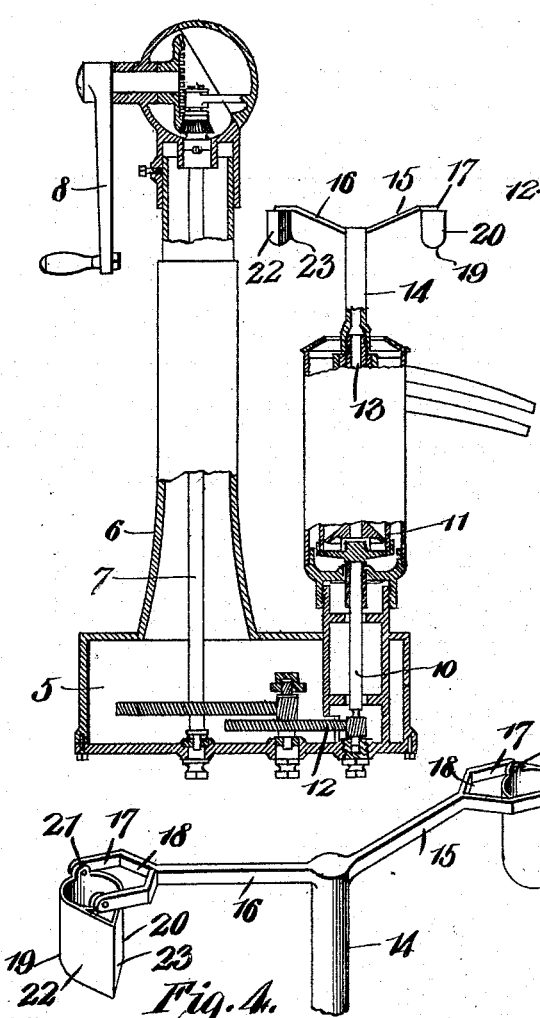

WILBUR SPRALEY, OF HOUSTON, OHIO.

CREAM-TESTER.

995,192. Specification of Letters Patent. Patented June 13, 1911.

Application filed August 29, 1910. Serial No. 579,612.

*To all whom it may concern:*

Be it known that I, WILBUR SPRALEY, a citizen of the United States, residing at Houston, in the county of Shelby and State of Ohio, have invented new and useful Improvements in Cream-Testers, of which the following is a specification.

This invention relates to improvements in cream testers of the centrifugal type and has for its object the provision of a device of that kind which may be conveniently secured to the rotating part of a cream separator and when so secured may be rotated in the ordinary manner by the actuating mechanism of the cream separator, whereby the use of a special actuating device to operate devices of this type will be eliminated.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming part of the specification:—Figure 1 is a side elevation of a well-known form of cream separator partly in section and showing my improved device applied thereto. Fig. 2 is a fragmentary section of another well-known type of cream separator showing the device provided with a modified form of attachment and applied thereto. Fig. 3 is a detail perspective of one of the tube holders. Fig. 4 is a detail perspective of the upper end portion of the tube holding device.

Similar numerals of reference are employed to designate corresponding parts throughout.

The form of cream separator shown in Fig. 1 is covered by Letters Patent #895,076 of Aug. 4, 1908, this device embodying the general features of most cream separators and as shown in Fig. 1 includes a hollow base 5 from one end portion of which rises a tubular pedestal 6 having journaled therein a vertical shaft 7 provided at one end with a gear which is rotated by means of a crank handle 8 journaled in the upper end portion of the pedestal 6 and having at its inner end a gear which meshes with the gear of the shaft 7. The vertical shaft 10 is arranged at the opposite end of the base supporting the cup 11, connection between the shafts being established by means of a train of gearing 12. Extending centrally of the cup 11 is a feed tube 13, the upper end of which is screw threaded.

The device forming part of the subject matter of the present invention is shown to include a shaft section designated by the numeral 14, one end portion of which is enlarged and provided with an axially threaded bore to receive the threaded portion of the tube 13. Extending in opposite directions from the shaft section 14 are a pair of arms 15 and 16, said arms being substantially horizontal and terminating in forked extensions 17. The terminals of the forked extensions 17 are inturned as shown at 18 and spaced.

The tube holders each comprise a circular base portion 19 from the periphery of which rises a circular side wall 20, and secured at opposite points on the upper end of the side wall 20 are lugs 21 having transverse openings which receive the inturned terminals 18 of the forked extensions 17.

Formed integral or otherwise secured to one side of each of the tube holders is a shield which in the present instance is shown to be formed of a single piece of sheet metal corresponding in length to the length of the tube holder and bent longitudinally at its middle portion to provide sides 22 and 23, said sides 22 and 23 being at acute angles to each other and secured at their longitudinal edges to opposite points on the side wall 20.

The shields are so positioned that when the shaft 14 rotates in one direction and the tube holders move outwardly the sharpened edges of the shields, located along the line of bending will cut through the air thus reducing the resistance of the latter to a minimum.

In the modified form illustrated in Fig. 2 a shaft section 24 is provided at one end with an exteriorly screw-threaded boss 25 and screwed into the axially threaded bore of the shaft section 14. The opposite end of the section 24 is provided with a spiral thread 26 to engage the worm idler of the train of gearing 12 when the shaft 10 shown in Fig. 1 is removed from the base.

From the foregoing, it is evident that I have provided a device which is comparatively simple in structure and inexpensive to manufacture, embodying few parts and these so arranged that the danger of derangement will be reduced to a minimum.

I claim:—

A centrifugal cream tester comprising a standard having one end socketed and interiorly screw-threaded to receive the screw-threaded end of the rotary shaft of a cream separator, a pair of oppositely extending arms arranged at the opposite end of the shaft, said arms terminating in forked extensions, the terminal portions of which are inturned, tube holders provided with oppositely disposed perforated lugs to receive the inturned terminal portions of the said forked extensions, the said tube holders being further provided on one side with angular-shaped shields, for the purpose described.

In testimony whereof I affix my signature in presence of two witnesses.

WILBUR SPRALEY.

Witnesses:
 FRANK J. SIMON,
 LEO MONNIER.

---

Copies of this patent may be obtained for five cents each, by addressing the "Commissioner of Patents, Washington, D. C."